2,954,409

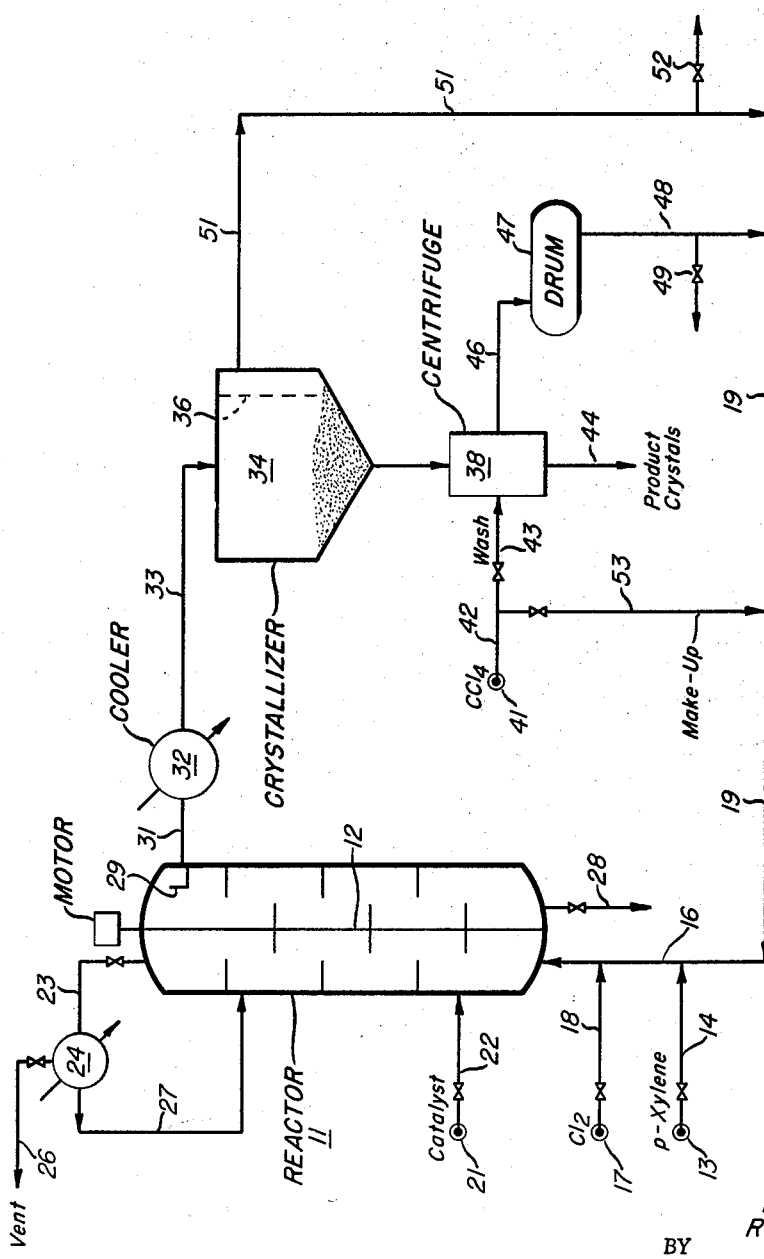

PROCESS FOR MAKING TETRACHLORO-p-XYLENE

Edward A. Swakon, Hammond, and Richard E. Van Strien, Griffith, Ind., assignors to Standard Oil Company, Chicago, Ill., a corporation of Indiana Filed Aug. 29, 1958, Ser. No. 758,100

9 Claims. (Cl. 260—650)

This invention relates to tetrachloro-p-xylene and particularly an improved process for making this compound.

The prior art processes for preparing chloro-p-xylenes separate the chlorinated mixture by distillation. This is an elaborate, expensive operation. It has been discovered that by carrying out the chlorination of p-xylene or lower chloro-p-xylenes in the presence of a normally liquid chlorinated aliphatic hydrocarbon containing from 1 to 4 carbon atoms and at least 1 chlorine atom, at the usual moderately elevated temperatures, it is possible to crystallize out of the liquid solution containing the chloro-p-xylenes a solid product of essentially pure tetrachloro-p-xylene. The solid tetrachloro-p-xylene is separated from the mother liquor which contains essentially all of the lower chloro-p-xylenes produced. The solution separated from the solid tetrachloro-p-xylene product may be recycled to the chlorination zone. When it is preferred to avoid the presence of solid tetrachloro-p-xylene in the chlorination zone, the amount of chlorine added is adjusted to obtain a product solution containing tetrachloro-p-xylene in an amount no greater than its solubility at the chlorination zone temperature.

The charge to the chlorination zone may be p-xylene itself or a lower chloro-p-xylene or mixture of these. The lower chloro-p-xylenes are understood to be chlorinated p-xylenes containing 1, 2 or 3 chlorine nuclear substituents such as monochloro-p-xylene, dichloro-p-xylene or trichloro-p-xylene.

The chlorination reaction is carried out preferably in the presence of a chlorination catalyst such as metallic iron powder or iron chloride or any of the catalysts conventionally known to be effective in chlorination reactions may be used in this process.

A chlorination reaction is carried out in the presence of a solvent for p-xylene and chloro-p-xylenes. The particular solvent used in the process of the invention has much, much more capacity for the lower chloro-p-xylenes at ordinary atmospheric temperatures than for tetrachloro-p-xylene. The solvent of the process of the invention is a normally liquid chlorinated aliphatic hydrocarbon containing from 1 to 4 carbon atoms and at least 1 chlorine atom. It is preferred to operate with a member of the defined class of solvents, which boils at about the desired chlorination zone temperature. By this means, it is possible to carry out the chlorination at the desired temperature using a reflux condenser for returning solvent to the zone and permitting operation at about atmospheric pressure. It is to be understood that lower boiling compounds of the defined class of solvents may be used by operating at super atmospheric pressure. Examples of compounds which may be used as solvents are chloroform, carbon tetrachloride, dichloroethane, tetrachloroethane, tetrachloroethylene, n-propyl chloride, 1,1-dichloropropane, 2,2-dichloropropane, 1,1,2-trichloropropane, 1,1,3-trichloropropane, 1,1,1,2-tetrachloropropane, 1,2,2,3-tetrachloropropane, 1,1,2,3,3,-pentachloropropane, 1,1,1,2,3,3,3-heptachloropropane, 1,2,3-trichloropropene-1, n-butyl chloride, isobutyl chloride, t-butyl chloride, 2-chlorobutene-1, 1,2,3-trichlorobutane, 2,2,3-trichlorobutane, and 1,1,1,2-tetrachlorobutane.

The chlorination may be carried out at temperatures and pressures such as are conventionally used. In general, the chlorination zone temperature is maintained between about 40° C. and 150° C.; in the case of the lower boiling members of the class of defined solvents, it is customary to operate at a temperature corresponding to the reflux temperature of the solution existing in the chlorination zone. In general, it is preferred to operate the chlorination zone at a temperature between about 60° C. and 90° C.

The amount of chlorine added to the chlorination zone is adjusted to produce a mixture of chloro-p-xylenes, which mixture contains an amount of the lower chloro-p-xylenes less than the saturation content of the solution, at the temperature to which the product solution is to be cooled subsequent to the chlorination reaction. The amount of chlorine added may result in the production of an amount of tetrachloro-p-xylene in excess of the saturation limit of the solution at the chlorination zone temperature. It is preferred to adjust the amount of chlorine added to produce an amount of tetrachloro-p-xylene in excess of that soluble in the solution at the temperature to which the product solution is to be cooled and on the order of the solubility in the product solution at the chlorination zone temperature.

The product solution comprises the chlorinated hydrocarbon solvent, chlorinated p-xylenes and unreacted p-xylene, if p-xylene was present in the charge. The chlorinated p-xylenes comprise tetrachloro-p-xylene and a mixture of lower chloro-p-xylenes. This product solution from the chlorination zone is cooled to a temperature such that crystals of tetrachloro-p-xylene are formed as essentially the only solid product i.e. the temperature is such that the saturation point of the product solution with respect to any of the lower chloro-p-xylenes present is not reached. In general, the product solution is cooled to a temperature within ordinary atmospheric temperature range, namely, between about 0° C. and 40° C. and more usually between about 15° C. and 30° C. The solid product tetrachloro-p-xylene is separated from a liquid solution of reduced tetrachloro-p-xylene content. If essentially pure tetrachloro-p-xylene is desired, the crystals may be washed with fresh solvent to remove adhering solution. The separated solution and washings may be recycled to the chlorination zone.

The crystals of solid tetrachloro-p-xylene may be separated from the mother liquor by decantation, filtration, centrifuging or any of the conventional procedures for separating liquid from solid, without resorting to vaporization.

The following illustrates the very, very great difference in capacity of the defined class of chlorinated aliphatic hydrocarbons for lower chloro-p-xylenes and tetrachloro-p-xylene. At 25° C. dichloro-p-xylene is soluble in chloroform to the extent of 34 grams per 100 grams of solvent and in tetrachloroethylene to the extent of 31 grams per 100 grams of solvent. Trichloro-p-xylene at 25° C. is soluble in chloroform to the extent of 40 grams per 100 grams of solvent and in tetrachloroethylene to the extent of 62 grams per 100 grams of solvent. Tetrachloro-p-xylene at 25° C. is soluble in chloroform to the extent of 3 grams per 100 grams, in carbon tetrachloride to the extent of 3 grams per 100 grams and in tetrachloroethylene to the extent of 4 grams. The solubility of tetrachloro-p-xylene at the boiling point of chloroform (61° C.) is 13 grams per 100 grams of solvent; the solubility in carbon tetrachloride at its boiling point (77° C.) is 11 grams per 100 grams of solvent; the solubility in tetrachloroethylene at 100° C. is well in excess of 25 grams per 100 grams of solvent.

An illustrative embodiment of the process is set out in conjunction with the annexed figure. The figure is schematic and many items of process equipment have been omitted which can be added by anyone of ordinary skill in this art. It is to be understood that the embodiment is not limiting on the scope of the invention.

In the figure the chlornation reaction is carried out in reactor 11. Reactor 11 is provided with a motor driven stirrer 12 and baffles, not numbered, which permit efficient agitation within reactor 11. In this embodiment nitration grade p-xylene is added from source 13 by way of valved line 14 and line 16 into the bottom of reactor 11. Chloride from source 17 is passed by way of valved line 18 and line 16 into reactor 11. Recycle material is passed by way of lines 19 and 16 into reactor 11. Ferric chloride catalyst is added periodically from source 21 by way of valved line 22 into reactor 11.

In this embodiment the solvent is carbon tetrachloride. The chlorination reaction is carried out at the reflux temperature of the solution existing in reactor 11, which is about 80° C. The amount of chlorine added is such that all of the tetrachloro-p-xylene produced remains in solution at chlorination temperature. In general, when carbon tetrachloride is the solvent, the solution produced in reactor 11 preferably contains from about 7 to 10 grams of tetrachloro-p-xylene per 100 grams of carbon tetrachloride in the solution.

Reactor 11 is operated at atmospheric pressure. The product HCl and carbon tetrachloride vapors pass out of reactor 11 by way of valved line 23 into condenser 24. The HCl is passed from the system to a vent or recovery by way of valved line 26. The liquid carbon tetrachloride produced in condenser 24 is returned by way of line 27 to reactor 11. Reactor 11 is provided with draw-off line 28.

Product solution comprising carbon tetrachloride and tetrachloro-p-xylene is continuously withdrawn from reactor 11 by way of a trap-out 29 and passing by way of line 31 into cooler 32. In cooler 32 the product solution is lowered in temperature to about 25° C. The cooled product solution is passed by way of line 33 into crystallizer 34.

Crystallizer 34 may be any conventional form of crystallizing vessel such as the coned-bottom vessel provided with a baffle 36 as shown here. In crystallizer 34 solid tetrachloro-p-xylene settles out of the second solution, i.e., mother liquor, which contains essentially all of the lower chloro-p-xylenes present in the product solution. The crystals of tetrachloro-p-xylene are withdrawn from crystallizer 34 by way of line 37 and passed into centrifuge 38.

Centrifuge 38, in this embodiment, is adapted to permit continuous washing of the crystals recovered. Carbon tetrachloride from source 41 is passed by way of line 42 and valved line 43 into centrifuge 38 to remove adhering mother liquid from the crystals. The washed, essentially pure product crystals of tetrachloro-p-xylene are removed from centrifuge 38 by way of line 44. The mother liquor separated from the tetrachloro-p-xylene crystals and wash liquid are passed by way of line 46 into collecting drum 47. The material from drum 47 may be recycled to reactor 11 by way of lines 48, 19 and 16 or may be entirely or in part withdrawn from the operation by way of line 48 and valved line 49.

The mother liquor decanted from crystals in separator 34 is withdrawn by way of line 51 and may be recycled to reactor 11 by way of lines 19 and 16; or entirely or in part the mother liquor from line 51 may be withdrawn from the system by way of valved line 52.

Makeup carbon tetrachloride is introduced into the system from solution 41 by way of line 42 and valved line 53.

*Example*

The reactor consisted of a 3-neck, round bottom flask with U-shaped side arm about ⅔ of way up from the bottom of flask. The flask was equipped with chlorine addition tube, inlet for filtrate, water-jacketed stirrer, thermometer and water-cooled condenser. Chlorine was led from chlorine cylinder through a calibrated flow-meter to a trap and then to the reactor.

Reaction solution was drawn off continuously through the U-shaped side arm and led to the top of the crystallizer. Crystallizer was made from 1½ inch glass tubing and was 30 inches long. The top was fitted with an 8-mm. take-off tube and 10-mm. tube extending from the center 12 inches into the 1½-inch tube. The bottom 6 inches of the 1½-inch tube was tapered and fitted with a large opening stop cock. After the first day of operation, the crystallizer served as a hold-up tank from which the solution was withdrawn when it became full. The solution was then cooled in an ice-water bath and then filtered to recover the product. The filtrate was led to a hold-up tank from which it was pumped to the reactor. The hold-up tank consisted of pear-shaped separatory funnel of 500 ml. capacity. The pump was a bellows-type and was adjusted to pump about 600 ml. of carbon tetrachloride per hour.

The reactor was charged with 53 g. of p-xylene (0.5 mole, 98.5% purity), 500 ml. of carbon tetrachloride, 2 g. of 20-mesh iron filling and 3 g. of ferric chloride. Chlorine was passed into the solution at one mole per hour for 1.75 hours to convert half of the initial charge of p-xylene to tetrachloro-xylene and half to trichloro-xylene. After this period, the reaction was put into continuous operation. The hold-up flask was filled with 500 ml. of carbon tetrachloride and 26 g. of p-xylene (¼ mole), and pumped to the reactor in about one hour. Carbon tetrachloride was added to the hold-up tank periodically to keep the system full. Each hour of operation, 26 g. of p-xylene was added to the hold-up flask. Cool reaction solution was withdrawn periodically from the crystallizer and filtered. In the latter part of the experiment, the reaction solution was cooled further in ice-water bath before filtering. Filtrate was returned to the hold-up flask. The reaction was run for four hours the first day and for eight hours each for the next two days. Additional ferric chloride catalyst (4 g.) was added after 16 hours of operation. The product consisted of straw-colored, fine needles.

Thus having described the invention, what is claimed is:

1. A process for making tetrachloro-p-xylene which process comprises (1) chlorinating at a temperature between about 40° C. and about 150° C. a liquid feed selected from the class consisting of p-xylene and lower chloro-p-xylene in the presence of a normally liquid chlorinated aliphatic hydrocarbon containing from 1 to 4 carbon atoms and at least one chlorine atom, to obtain a solution of chlorinated p-xylene in said chlorinated hydrocarbon, said chlorinated p-xylene consisting of tetrachloro-p-xylene and a mixture of monochloro-p-xylene, dichloro-p-xylene and trichloro-p-xylene, (2) cooling said solution to a temperature such that crystals of tetrachloro-p-xylene are formed, as essentially the only solid product, and (3) separating said solid product from liquid solution of reduced tetrachloro-p-xylene content.

2. The process of claim 1 wherein said chlorinated hydrocarbon is carbon tetrachloride.

3. The process of claim 1 wherein said chlorinated hydrocarbon is tetrachloroethylene.

4. The process of claim 1 wherein said chlorinated hydrocarbon is chloroform.

5. The process of claim 1 wherein said chlorinated hydrocarbon is tetrachloroethane.

6. The process of claim 1 wherein the chlorine usage is adjusted to produce a solution containing tetrachloro-p-xylene in an amount on the order of the solubility in said solution at the chlorination zone temperature.

7. The process of claim 6 wherein said chlorinated hydrocarbon is carbon tetrachloride, said chlorination zone temperature is about reflux temperature at about atmospheric pressure and said solution is cooled to about ordinary atmospheric temperature.

8. The process of claim 6 wherein said solution from step 3 is recycled to the chlorination zone.

9. A process for making tetrachloro-p-xylene which process comprises (a) chlorinating at about reflux temperature at about atmospheric pressure a liquid feed selected from the class consisting of p-xylene and lower chloro-p-xylene in the presence of liquid carbon tetrachloride to obtain a liquid solution consisting essentially of tetrachloro-p-xylene and a mixture of monochloro-p-xylene, dichloro-p-xylene and trichloro-p-xylene, the chlorine usage being adjusted to provide a solution containing between about 7-10 grams of tetrachloro-p-xylene per 100 grams of carbon tetrachloride, (b) cooling said solution to a temperature between about 15° C. and 30° C. to produce crystals of solid tetrachloro-p-xylene and a second solution containing essentially all of the lower chloro-p-xylene present in said solution, (c) removing said crystals from contact with said second solution, (d) and washing said crystals to remove adhering second solution to obtain crystals of essentially pure tetrachloro-p-xylene.

References Cited in the file of this patent

UNITED STATES PATENTS

| | | |
|---|---|---|
| 1,934,675 | Mills | Nov. 7, 1933 |
| 2,721,224 | Rosin | Oct. 18, 1955 |
| 2,729,685 | Weimer et al. | Jan. 3, 1956 |
| 2,805,264 | Kissling | Sept. 3, 1957 |

OTHER REFERENCES

Rupp: "Ber. der deut, Chem. Gesell.," vol. 29, pp. 1625-8 (1896).